United States Patent [19]

Quintilian

[11] 4,319,129
[45] Mar. 9, 1982

[54] AUTOMATIC FUEL MONITORING SYSTEM

[76] Inventor: Bartholomew F. Quintilian, 4259 Sheldon Ave., Baltimore, Md. 21206

[21] Appl. No.: 98,346

[22] Filed: Nov. 28, 1979

[51] Int. Cl.³ ............................................. G01C 22/00
[52] U.S. Cl. ................................ 235/97; 235/92 DN
[58] Field of Search ................ 235/61 J, 61 M, 94 R, 235/94 A, 92 T, 95 R, 97, 144 M, 92 DN; 364/424, 442

[56] References Cited

U.S. PATENT DOCUMENTS

| | | | |
|---|---|---|---|
| 1,340,493 | 5/1920 | Miller | 235/97 |
| 1,593,637 | 7/1926 | Miller | 235/97 X |
| 2,312,342 | 3/1943 | Lang | 235/144 M |
| 2,531,448 | 11/1950 | Lingenfelder | 235/95 R |
| 3,549,868 | 12/1970 | Watson | 235/92 T |
| 3,962,986 | 6/1976 | Fujita et al. | 235/95 R X |
| 4,046,998 | 9/1977 | Kuno et al. | 364/442 |
| 4,053,749 | 10/1977 | Shinoda et al. | 364/424 |

Primary Examiner—L. T. Hix
Assistant Examiner—Benjamin R. Fuller
Attorney, Agent, or Firm—John F. McClellan, Sr.

[57] ABSTRACT

A system for budgeting fuel allotments includes a short-term odometer and a long term odometer, apparatus for entering allocated amounts of fuel on the odometers in terms of budget period and mileage, mechanism for connecting with a vehicle odometer cable to subtract mileage first from the allotment displayed on the short-term odometer and then through automatic changeover to the allotment displayed on the long term odometer, apparatus signalling the changeover, and mechanism for locking the settings and cover of the housing for the system; both built-in and externally attachable embodiments are disclosed, as well as an embodiment providing for flexible separate location of the odometers and associated equipment.

12 Claims, 13 Drawing Figures

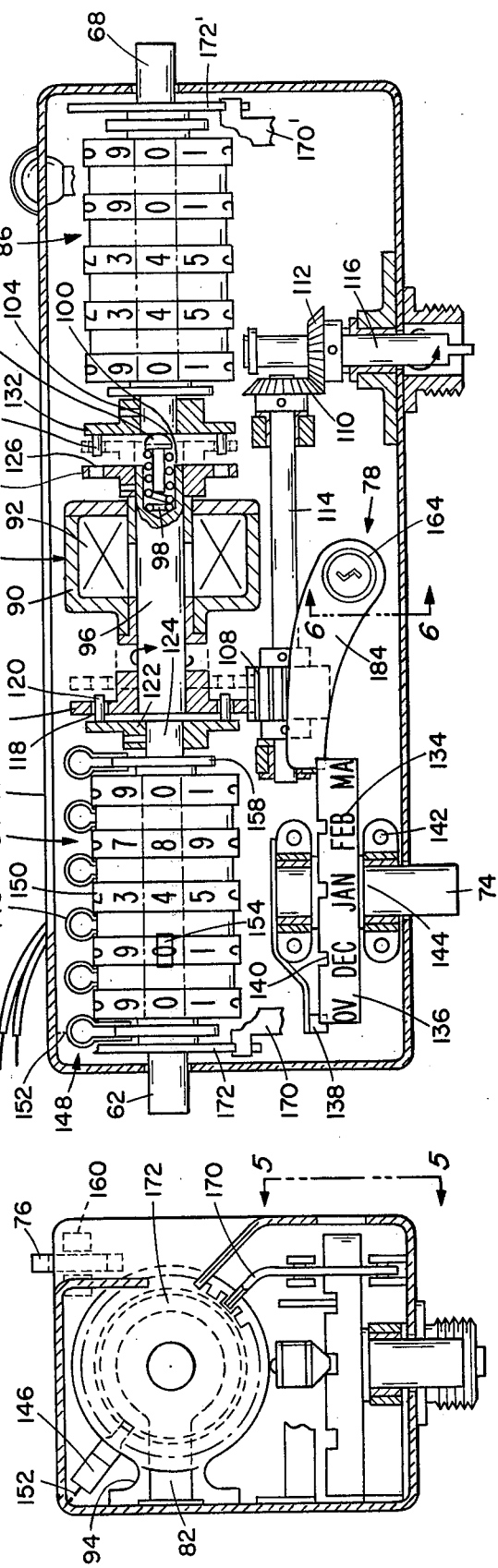
Fig. 4
Fig. 3
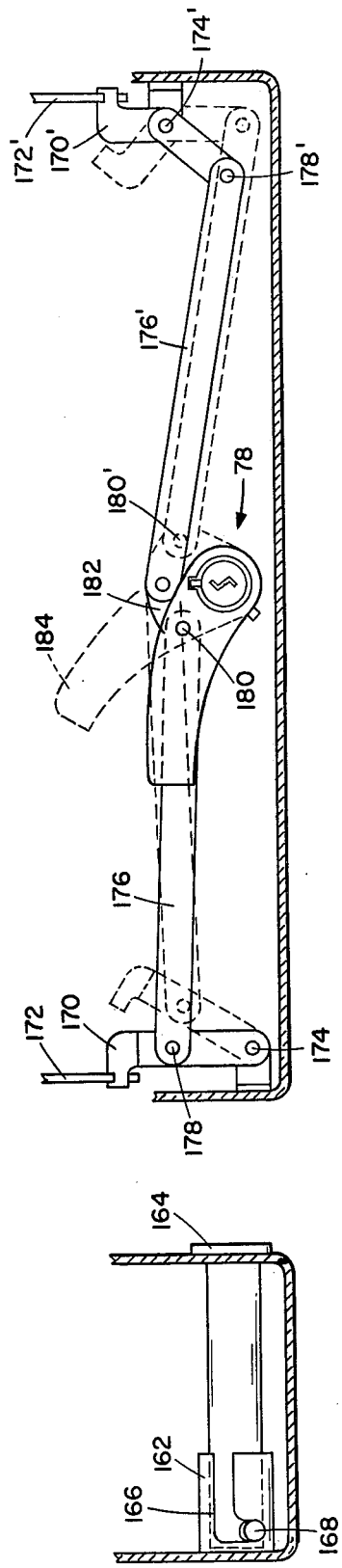
Fig. 5
Fig. 6

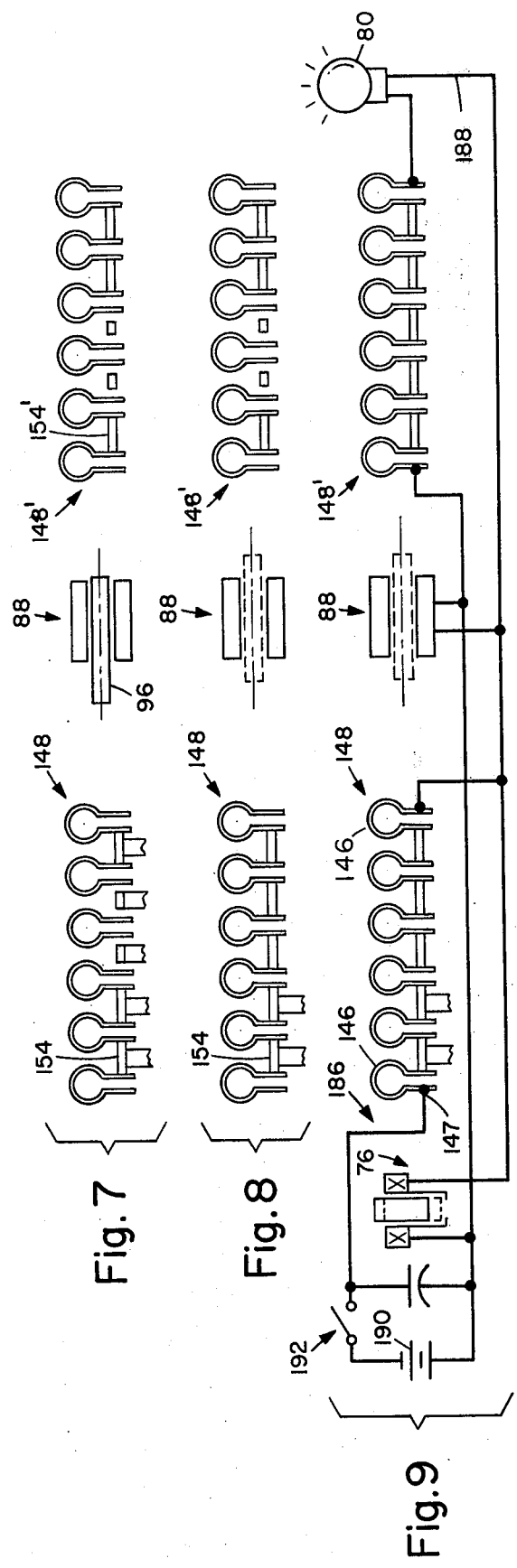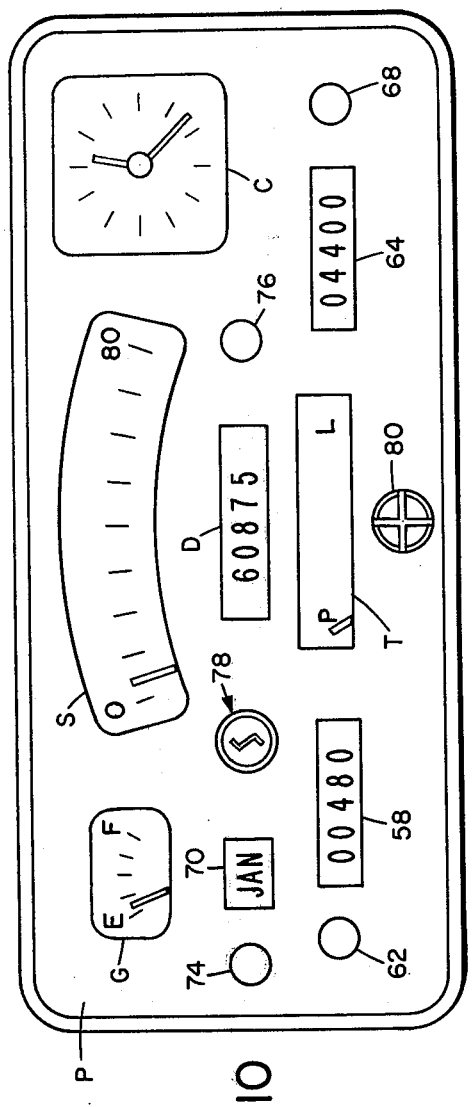

AUTOMATIC FUEL MONITORING SYSTEM

This invention relates generally to motor vehicle accessory apparatus and specifically to monitoring of fuel consumption in a particular motor vehicle.

Severe and continuing fuel shortages and rationing in the United States have been predicted by respected observers of the economy. These problems will cause a special type of hardship on those unwilling or unable to budget fuel consumption efficiently.

A principal object of the invention is to provide an on-board system for automatic budgeting of an allocated fuel supply in terms of miles over both short-term and extended periods, so that the operator of a motor vehicle can tell at a glance the theoretical reserve in miles remaining at any time, in his allocated fuel supply or the deficiency in same.

In the prior art various types of apparatus have been disclosed which can or do relate to calculations of fuel consumption, including those of the following U.S. Patents, but the present invention is believed more understandable and practical for the purpose than any of these:

U.S. Pat. No. 4,053,749 to Y. Shonida, Oct. 11, 1972, discloses an electrical subtracting odometer;

U.S. Pat. No. 4,046,998 to A. Kuno, Sept. 6, 1977, discloses a running-distance fuel meter which takes account of fuel consumption rate and quantity of fuel remaining to give an indication of remaining distance which can be traveled at any given time;

U.S. Pat. No. 3,935,996 to H. Kleinbuhl, Feb. 2, 1976, discloses an odometer which warns of commencement of particular periods on basis of mileage;

U.S. Pat. No. 3,549,868 to F. R. Watson et al., Dec. 22, 1970, discloses circuitry which can indicate remaining distance attainable, by computation based on current consumption and remaining quantity of fuel;

U.S. Pat. No. 2,312,342 to W. B. Lang, Mar. 2, 1943, discloses a reconnaissance device with plural independent re-settable odometers.

In addition it is known that certain vehicles made by General Motors have as an option had elaborate fuel consumption and current quantity and mileage prediction instrumentation much more elaborate than the present invention and incapable of providing budgetary information in the same manner as the present invention.

At present instead of effective voluntary budgeting of fuel there is a demonstrated lack of cooperation between motor vehicle fuel allocators and motor vehicle fuel distributors at the consumer level, which brings on periodic crisis in supply at the pump causing great loss of time, money, and often unnecessary inequities.

Still further objects of the present invention are to provide a system as described which will encourage the practice of fuel budgeting, will discourage wasteful practices by making it easy to follow a programmed allocation presented by means of automatic signalling apparatus, will make possible more accurate predictions for fuel allocation in communities, will promote a higher public regard for conservation, will insure more nearly fair sharing in fuel distribution, and will permit starting up effective budgeting on a voluntary basis in a manner promoting more orderly, less resented and less confusing eventual changeover to mandatory motor vehicle fuel rationing.

Objects in further important aspects are to provide a monitor system for fuel budgeting which has only as much mechanism as is necessary, so that it economically assumes certain information in predicting the future, and which is simple and relatively foolproof in that it reads in terms of remaining miles that can be travelled, so that once the system is set up, no mental steps are required to ascertain the needed information.

In brief summary given as cursive description only and not as limitation the invention provides a fuel monitor or system which concurrently with vehicle operation keeps a budget showing estimated remaining portion of allocated supply in terms of miles of travel, at any one time, preferably broken down into short term periodic supply and reserve supply.

The above and other objects and advantages of this invention will become more readily understood on examination of the following description, in which like reference numerals refer to like parts:

FIG. 3 is a left end elevational view partly in section, adapted from FIG. 4;

FIG. 4 is a front elevational view of a portion of the invention with instrument panel which covers it removed and with locking mechanism partially broken away for exposition;

FIG. 5 is a view similar to that of FIG. 4 showing further locking details;

FIG. 6 is a detail adapted from 6—6, FIG. 4;

FIG. 7 and FIG. 8 are successive-position elevational diagrams depicting relation of electrical contacts and counter positions;

FIG. 9 is a further successive-position elevational diagram of the mechanisms of FIGS. 7 and 8, with a schematic showing of electrical hookup; and FIG. 10 is a front elevational view of an alternative arrangement with the instrument control and showings of this invention integrated in the instrument panel of a motor vehicle;

INPUT CONNECTIONS; DISPLAYS

Figure 1:
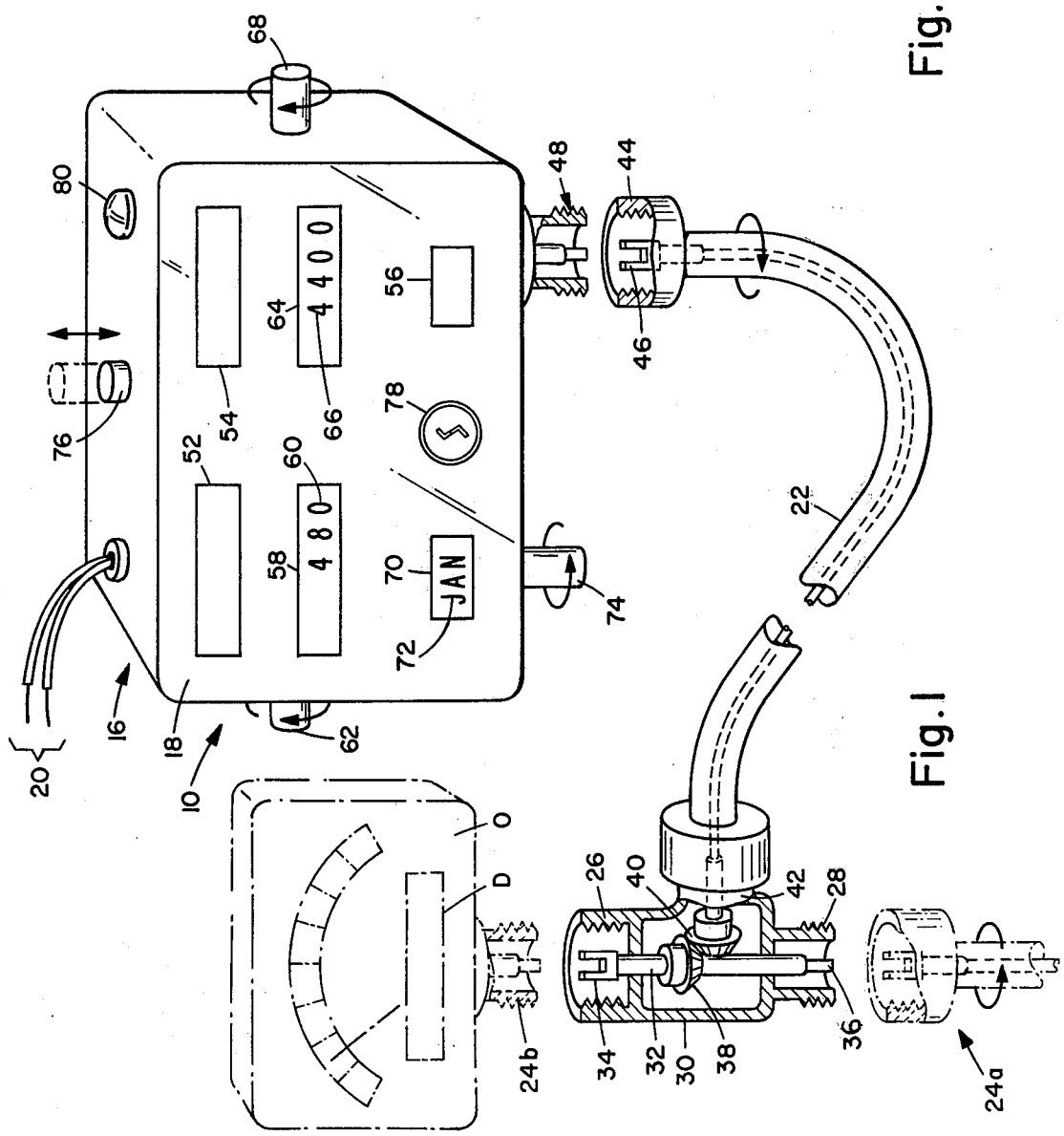
FIG. 1 is a perspective view showing an attachment of the invention to any conventional vehicular odometer (phantom lines)

FIG. 1 shows the invention 10 or fuel monitor in operating position in a motor vehicle, preferably with the housing 16 with the display panel front cover 18 mounted to the dashboard adjacent the conventionally supplied and mounted vehicle odometer O, and display D for the vehicle odometer.

Connections at only two points are necessary: through electric leads 20 to the vehicle electric power supply and through flexible cable assembly 22 to the odometer drive cable assembly 24a, 24b of the vehicle.

The connection to the odometer drive maybe through a threaded-both-ends 26, 28, splice-in tube 30 rotatably mounting a shaft 32 having at each end a rotary coupling 34, 36 for connecting with respective ends of the odometer drive cable assembly and having fixed to a mid portion of the shaft a first bevel gear 38 which drives a second bevel gear 40 held at right angles to it by threaded connection 42 of the flexible cable assembly.

A similar threaded connection 44 and universal drive coupling 46 serves to connect the flexible cable assembly with a similar mating assembly 48 on the bottom of the housing portion of the assembly.

The instrument panel 18 which covers the front of the housing portion and has a frame for the following displays:

52, 54, 56, blank frames for writing in pencil the numerical starting values of respective budgetary periods, respectively month, day and reserve;

58, monthly basic allotment or short period allotment frame which is a window; through the window is visible the short period allotment in units of miles or other distance units displayed as counter numerals 60 of a first counter with the housing; this display can be set or replenished or added-to, by means of first knob 62;

64, reserve allotment or long period allotment frame for the vehicle is a window; similarly visible through the window are numerals 66 displayed by a second counter in the same units, within the housing this display can be set or replenished or added-to, by means of second knob 68;

70, calendar frame exposes month-indications of time as display 72 on a calendar wheel; this can be set by means of third knob 74.

At the top of the housing there is a first warning means or indicator or drive button 76, which snaps up (broken lines) to indicate when the system switches over to the reserve allotment.

A lock 78 secures the case and unauthorized resetting of the first and second odometers (at frames 58 and 64) and the calendar wheel (at frame 70).

A red light 80 or second warning means signals exhaustion of mileage, total.

THEORY OF OPERATION

The invention is based in part on the premise that a system will be set up, possibly on a voluntary basis to start but more probably on a mandatory basis, to reward motorists or others responsible for vehicle operation who stay within rations or allotments of fuel representing their fair share of available fuel supplies.

In the past coupons were issued for the purpose and may be again, the system of this invention can save the accounting complexities and the thefts and losses to which coupon based systems are susceptible, but will work compatibly with a coupon system if necessary.

The general principle of the invention is that fuel allotments may be thought of in terms of daily and/or monthly apportionments, and reserves.

According to the invention the user as a preparatory step estimates the number of miles per gallon his vehicle will give, then multiplies his monthly allotment in gallons by this figure to give total miles he can expect the supply to provide in the month.

The allotting agency will also provide a yearly reserve of gallonage which also will be converted by the user into mileage. The motorist is now ready to use the invention.

SETTING PROCEDURE

To program the invention 10 or fuel monitor, the short period or monthly basic allotment in terms of miles is by means of setting knob 62 set into the first counter or added to it or replenished so that the numerals 60 show it at frame 58.

Next the appropriate month indication 72 is by means of setting knob 74 set at frame 70.

Then the reserve mileage is set on the second counter at frame 64 by knob 68 numerals 66 show it.

Finally the monitor is key-locked at 78.

OPERATION

Forward motion of the vehicle causes the cable drive to reduce or currently diminish or deplete mileage at frame 58, the monthly allotment frame, in direct proportion to the increasing mileage indication on the vehicle odometer.

Should the monthly allocation mileage at frame 58 reduce to zero, signalling exhaustion of the basic allotment for that month, the monitor automatically stops depleting at frame 58 and switches to the reserve allotment at frame 64 and similarly depletes that allotment for the remainder of the month.

At the end of the month the motorist unlocks the unit, advances the next month on the calendar and resets the first odometer to show at frame 58 a fresh monthly allotment. Upon the resetting of the monthly basic allotment the depleted total on the reserve frame 64 remains as it is until there is a switchover to deplete it further as result of any overtravel of mileage.

For ready reference, the user can record in pencil at frames 52, 54, and 56 the starting allotment values.

Depletion of both the monthly allotment, frame 58, and the reserve allotment, frame 64, causes red light 80 to come on, and continued operation of the vehicle causes the reserve frame counter to pass to 999,999 and continue subtracting; this is further visual warning of overtravel.

FIGS. 2a through 2h sequentially diagram the panel 18 as it might appear at various successive times in operation.

Figure 2:
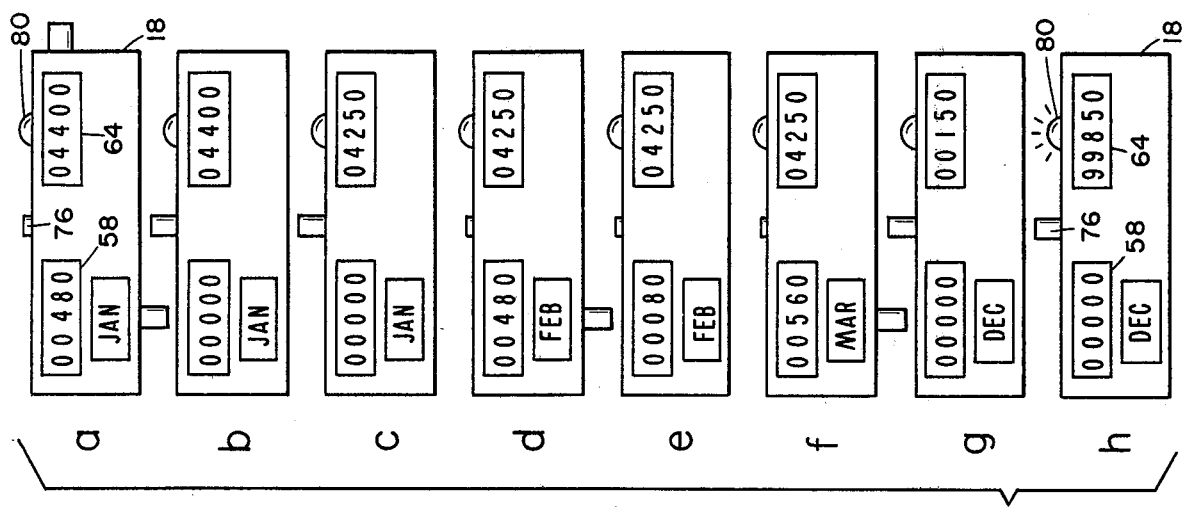
FIGS. 2a through 2h are respective time diagrams depicting typical successive outputs of information by the invention.

FIG. 2a shows mileage assigned on startup: at monthly basis allotment frame 58, 480 miles is allocated, as shown by calendar frame 70, for January, and at frame 64 an additional reserve for the year of 4400 miles. The overtravel or drive indicator 76 is down.

FIG. 2b shows mileage on January 20, for example. At this instant the monthly allotment, frame 58, has exhausted and the indicator 76 has popped up, signalling shift to the reserve frame 64.

FIG. 2c shows at frame 64 what might be the status the end of January; reduction of the reserve to 4250 miles.

FIG. 2d shows the status on February 1: a new monthly allotment of 480 miles has been set in at frame 58 and the indicator 76 has dropped to "down" position where it will remain until the reserve is again required.

FIG. 2e shows status at end of February: 80 miles show at frame 58 as remaining of the allotment for February.

FIG. 2f shows at frame 58 status at beginning of March: the sum of 80 miles carried over from February and the new allocation for March total 560.

FIG. 2g shows status in mid-December: the monthly mileage allotment is exhausted, the indicator is up and the reserve is down to 150 miles.

FIG. 2h shows at frame 58 exhausted status of the monthly allotment at the end of December, in addition the showing at frame 64 indicates that the reserve is exhausted and the odometer has passed through 999,999 and is now down to 999,850; red light 80 warns of exhaustion of both allocations.

FURTHER DETAILS OF CONSTRUCTION

FIGS. 3 and 4 show the general relation of the parts in a mechanical embodiment of the invention.

Rotatably mounted in coaxial relation within the housing 16 by bearing structures 82 are first and second counter assemblies 84, 86, respectively for showing for the monthly allotment and the reserve allotment. The counter assemblies have the respective setting knobs 62, 68 extending coaxially from the housing, and are separated by a coaxial electromagnetic clutch assembly 88 consisting of stator 90 with excitation coil 92 fixed by bracket 94 to the housing, and rotor in the form of shaft 96 supported by the stator and slidable between a left position and a right position.

An axial spring 98 in the bore 100 of the shaft urges a rivet-shaped thrust button 102 within it to the right against the inner end of the second counter axle 104, biasing the shaft 96 to the left position.

In both left and right positions a gear 106 fixed on the left end of shaft 96 engages a pinion 108 which is driven through bevel gears 110 and 112 on respective counter shaft assemblies 114 and 116 by the flexible cable.

In the left position holes 118 in gear 106 engage lugs 120 in plate 122 fixed on the inner end 124 of the shaft of the first counter 84, driving the first counter. In the right position attained by energization of the magnetic clutch 88 which overcomes the bias of spring 98, this first counter drive disengages and holes 126 in a plate 128 fixed to the right hand end of shaft 96 engage lugs 130 on a plate 132 fixed on the inner end 104 of the shaft of the second counter, driving the second counter 86.

The calendar mechanism comprises month-indicia 134 on the rim of notched wheel 136 which has a detent 138 stabilizing in the notches 140 corresponding to month settings. Bearing provisions 142 journal the axle 144 for the wheel, of which knob 74 is an extension.

The above mechanisms in these figures are of conventional construction in all respects not described.

The following diagrammatic description discloses a special provision for closing a circuit and energizing the electromagnetic clutch when all wheels in the first counter reach zero readings. Spring contacts 146 lie in a series 148 along the upper part of the first counter 84, one contact at each end and one in each of the spaces between counter wheels 150. They may be supported by insulative clamps represented by broken line 152 or by any other conventional means. There is a segmental contact 154 mounted at the zero position on each counter wheel, shown in FIG. 4 out of position for clarity.

The end contacts 146 can complete a series circuit through the other contacts and through wire terminal connections to be described in reference to the wiring diagram. There is a similar provision for the second counter but not shown here. Described further in later FIGS. are: these contact provisions and the circuitry by which they energize the electromagnetic clutch 88, and drive indicator 76, omitted for exposition in FIG. 4 but which has similar electromagnetic drive 160 (FIG. 3), and indicator means 76 which signals shift, from first or monthly allotment counter 84 when it reaches zero mileage, to reserve counter 86, is of conventional design (as shown below in FIG. 9).

The locking provision is indicated fragmentarily in FIG. 4 at 78, 164, 184, 170, 172 the next figures further show this provision.

FIGS. 5 and 6 in addition to presently discussed FIGS. 3 and 4 should be referred to for details of locking of the monitor to prevent unauthorized tampering.

Any convention barrel lock assembly 78 with key (not shown) may be employed.

This lock performs multiple functions:

a. it holds the front panel on the housing, the outer end of the barrel hub 162 having conventional disc shaped enlargement 164 engaging the front panel and inner end having an "L" shaped cam slot 166 engaged by cam follower 168 on the barrel when the barrel is in locked rotational position;

b. it locks the position of the setting knob 62 of the first counter 84 through engagement of lock arm 170 with notched disc 172 fixed coaxially on the setting knob by means of pivotal mounting of the arm to the housing at 174 and to first eccentric arm 176 at 178, the first eccentric arm being pivoted at 180 to eccentric plate 182 fixed on the lock barrel;

c. it locks the adjustment knob 68 of the second counter 86 by means 170' 172' 174' 176' 178' and 180' analogous to the provisions described by similar reference numerals in reference to locking the first counter adjustment knob;

d. it locks the calendar setting by means of calendar-wheel-notch engaging arms 184 which turns with the lock barrel.

FIG. 7 diagrammatically shows the two series 148, 148' of spring contacts 146, 146' of the first and the second counters respectively. When the segmental contacts 154, 154' which rotate with the counter wheels touch two of the spring contacts they close the circuit between them. In this Figure neither the circuit at the first counter nor the circuit at the second counter is closed all through the series. The electromagnetic clutch 88 is not activated, and the drive connection is to the first counter, shaft 96 being spring biased to the left.

FIG. 8 shows the circuit completed through the first counter series, 148, of spring contacts, and segmental contacts on the first counter, indicating that the monthly allotment has reduced to zero. This energizes the electromagnetic clutch 88 and throws the shaft 96 to the right hand position, to begin depletion of the reserve allotment.

FIG. 9 shows the condition when the circuit through both series 148, 148', is complete, and the overall circuitry 186, when both monthly and reserve allotments are exhausted, maintaining the parallel circuit connected electromagnetic clutch 88 and the drive indicator 76 in energized state by respective series relation with the first counter series, which remains fixed at this position because removed from connection with the drive, and through a parallel circuit branch 188 energizing the signal lamp indicator 80 through series connection with the second series 148' of contacts. The vehicle battery is represented at 190; across the set of input terminals 192 would be the vehicle ignition switch. Reference numeral 147 is a connection and reference numerals 146 designate end contacts.

FIG. 10 shows typical automobile instrument panel P as it might appear with the apparatus of this invention installed as original equipment. In addition to the conventional gas gauge G, speedometer S, clock C, odometer display D, and transmission setting indicator T, there are of the present invention the calendar frame 70 and knob 74, lock 78, monthly allotment exhaustion warning or drive indicator 76, monthly allotment frame 58 and knob 62 reserve allotment frame 64 and knob 68, and reserve allotment exhaustion warning light 80. Drive connection and other details would be the same in principle as previously described.

Figure 11:
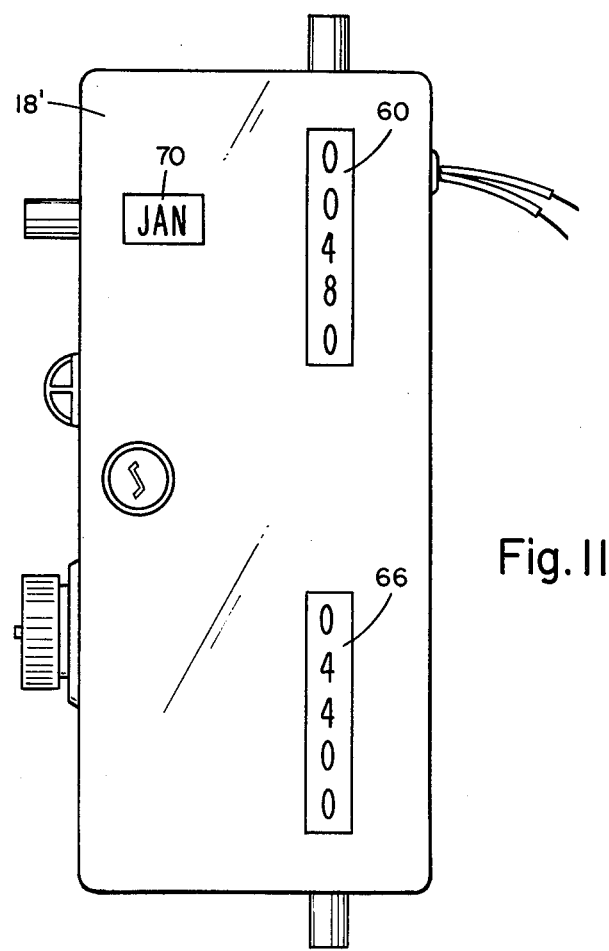
FIG. 11 depicts the appearance of a further alternative with the instrument panel portion of the invention vertically oriented.

FIG. 11 shows an alternative arrangement for the invention when a vertical panel display is used as at 18'. The numbers and letters 60, 66, 70 are at 90° to the horizontal embodiment but everything else is the same.

Although an electro-mechanical embodiment has been described it will be appreciated that electronic equivalents may be made without departure from the principle of the invention.

TWO-SECTION EMBODIMENT

To extend the adaptability of the Fuel Monitor, another arrangement has been conceived that provides for separation of the two odometers into two independent smaller assemblies interconnected with a dual function flexible cable that provides rotational and linear motion from one unit to the other and permits a certain amount of misalignment for easing alignment and spacing mounting constraints, the two units can be installed in areas of restricted space and when mounted, the relative positions can tolerate appreciable variations in distance and alignment in offset and in angle from each other. Some detail changes have been made in the interests of economy and miniaturization without affecting the end result. The following description covers only the elements of design that have been changed.

Figure 12:
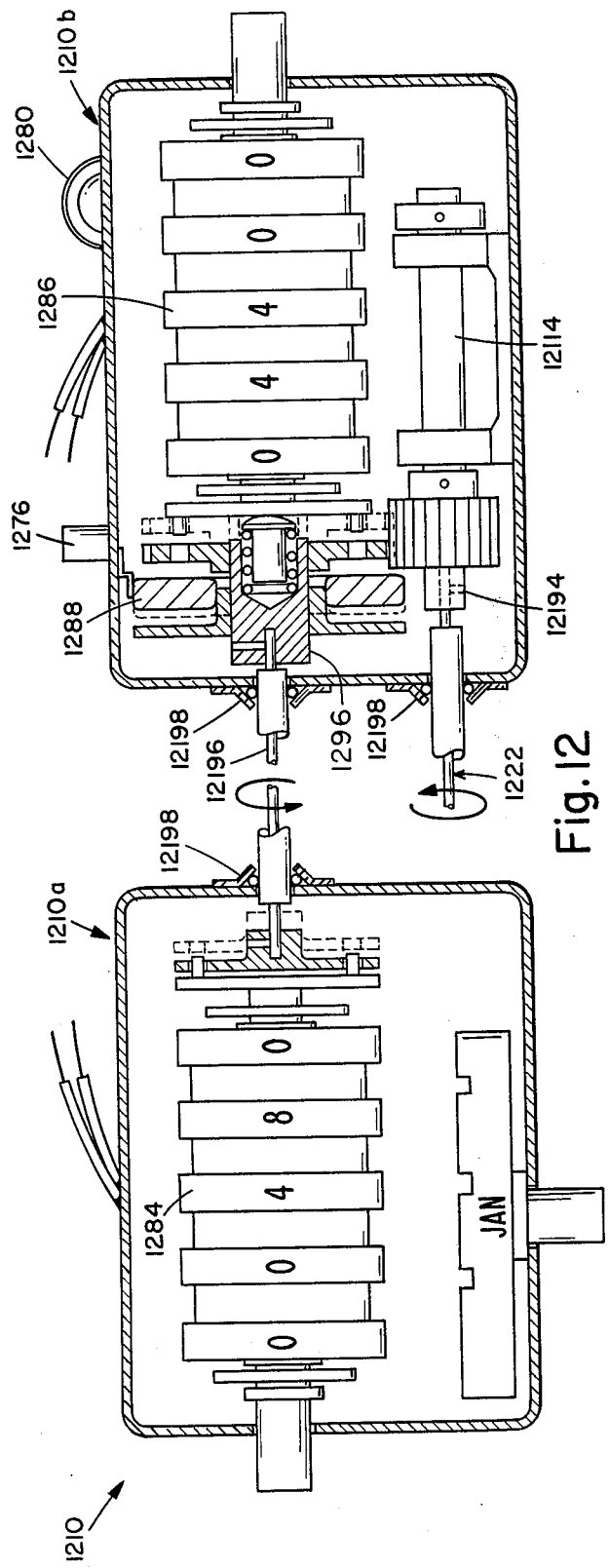
FIG. 12 is a front elevational view, partly in section, of an alternative two-section embodiment of the invention.

FIG. 12 is a front elevational view of embodiment 1210 (sections 1210a and 1210b) with periodic allotment odometer 1284 and reserve allotment odometer 1286 showing the drive elements with cover removed. The flexible cable assembly 1222 is connected directly to shaft assembly 12114. The active wire element of the cable is engaged into a hole of the shaft and held by a set-screw 12194. Rotation of the cable wire will produce rotary motions as in the above design. Parts 44, 46, 48, 116, 112, 110 of the above design are eliminated.

When all mileage is depleted at odometer 1284, magnetic clutch 1288, which is similar in action to the magnetic clutch on an auto air-conditioner compressor drive, is energized and pulls in shaft 1296, engages drive on odometer 1286 and disengages drive on odometer 1284. The active wire 12196 in the flexible cable assembly imparts rotational motion from right assembly to left assembly, and longitudinal motion from left assembly to right assembly. The longitudinal motion is same as in any conventional device operated remotely by such, as for example, a manual choke rod. The active wire ends are fastened by set-screws as on the incoming cable drive. The flexible cable assembly housings are clamped in position by the three clamp washers 12198 acting on resilient rubber O-rings.

The locking and resetting actions are similar to those of the above design. Locks 1378a and 1378b are actuated by a common key. Drive indicator button 1276 and warning light 1280 are located on the right assembly. The electrical wiring connections are such as to produce the same circuit functions as in the above embodiment.

Figure 13:
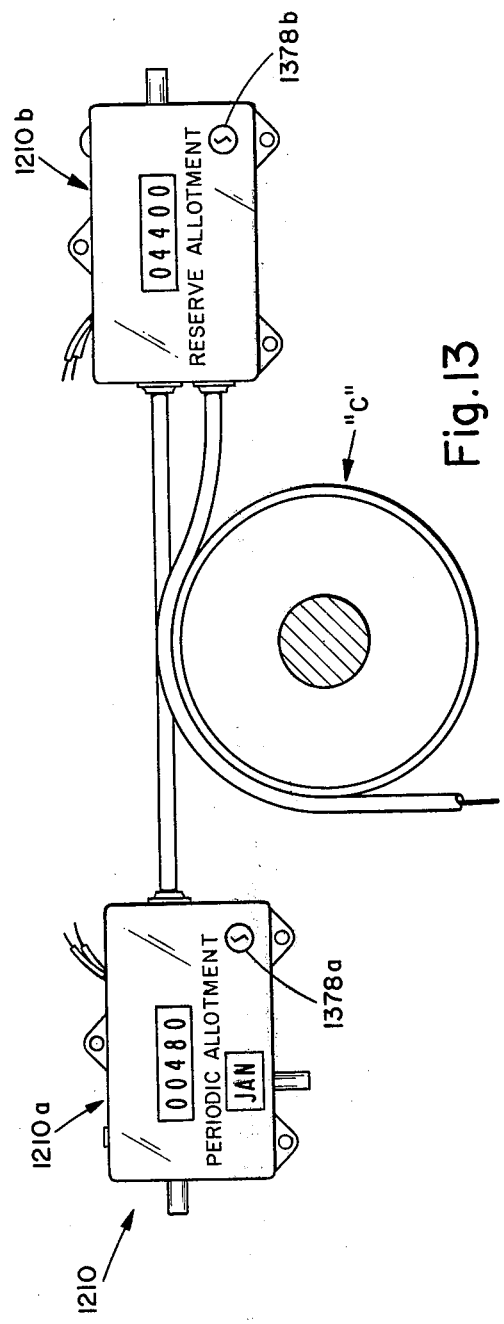
FIG. 13 is a front elevational view of same installed.

FIG. 13 shows the front elevational view of both odometers mounted conveniently around the steering column assembly "C" (shown in section) of a motor vehicle.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. A system for in-vehicle budgeting of fuel allotments comprising:
    means for displaying a short period allotment in units of travel distance and means for adjustably displaying said short period allotment in units of time,
    means for displaying a long period allotment in units of travel distance,
    means for currently depleting said display of short period allotment in accordance with vehicle distance travelled, means for periodically replenishing said display of short period allotment, means for resetting said units of time in accordance with said periodic replenishments, means for warning of exhaustion of the short period allotment display,
    circuit means for stopping depletion of the short period allotment display upon said exhaustion of the short period allotment and for thereupon currently depleting the long period allotment display in accordance with vehicle miles travelled, and means for warning of exhaustion of the long period allotment display.

2. A system as recited in claim 1, and means for replenishing the display of long period allotment.

3. A system as recited in claim 2, and means for locking all said short period display replenishing means, units of time display means, and long period display replenishing means.

4. A system as recited in claim 2, wherein the short period display means includes a first odometer.

5. A system as recited in claim 4, wherein the long period display means includes a said second odometer.

6. A system as recited in claim 5, wherein said vehicle has an odometer drive, and wherein said means for currently depleting includes a connection between said display means and said odometer drive.

7. A system as recited in claim 6, wherein said circuit means for stopping the short period display depletion and thereupon currently depleting the long period allotment comprises:
    the means for warning of exhaustion of the short period allotment display including an electric circuit,
    means on the first odometer for actuating a part of said electric circuit upon exhaustion of the short period allotment display,
    means responsive to said actuation including a clutch movable from a first position to a second position, first and second engagements on the clutch the first engagement selectively linking the first odometer in said first position with said connection, and the second engagement selectively linking the second odometer in said second position with said connection.

8. A system as recited in claim 7, the means for warning of exhaustion of the short period allotment display further including an electromagnet responsively movable on actuation of said electric circuit, and visual indicator means on said electromagnet.

9. A system as recited in claim 7, the means for warning of exhaustion of the long period allotment display including means on the second odometer for actuating a portion of said electric circuit upon exhaustion of the long period allotment display, and visual indication means responsive to actuation of said portion of the electric circuit.

10. A system as recited in claim 3, wherein the means for adjustably displaying units of time includes a notched calendar wheel, and wherein said locking means includes means having provision for engaging notches on said notched calendar wheel.

11. A system as recited in claim 5, and means easing alignment and spacing mounting constraints of said system, comprising the first odometer having a first housing, the second odometer having a second housing and drive cable means adjustably connecting the first odometer with the second odometer.

12. A system as recited in claim 2, wherein the means for adjustably displaying units of time can alternatively display units of time for said long period allotment.

* * * * *